Figure 1:
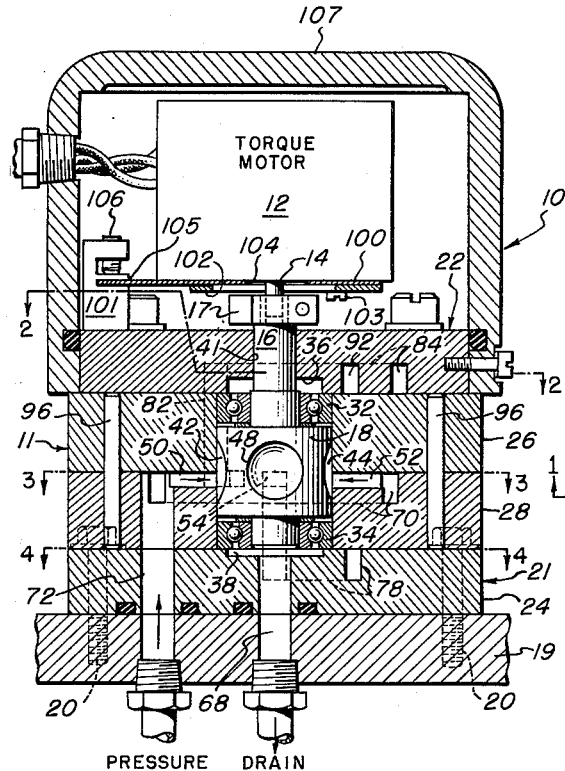

Nov. 7, 1961

P. J. HERZL 3,007,494

ROTARY FLUID VALVE

Filed Nov. 24, 1959

2 Sheets-Sheet 1

INVENTOR
PETER J. HERZL
BY
*Henry Huff*
ATTORNEY

Nov. 7, 1961 P. J. HERZL 3,007,494
ROTARY FLUID VALVE
Filed Nov. 24, 1959 2 Sheets-Sheet 2
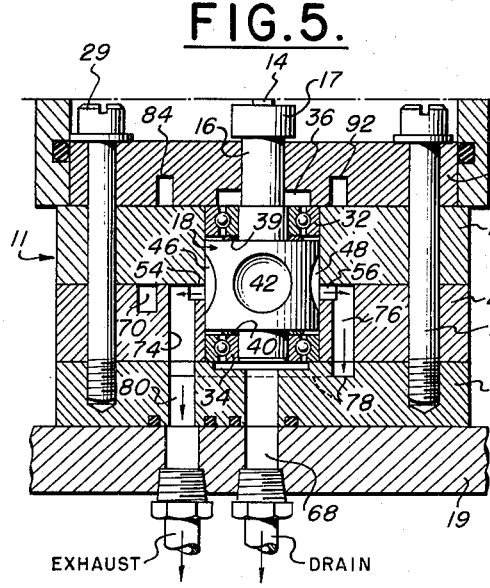
FIG. 5.
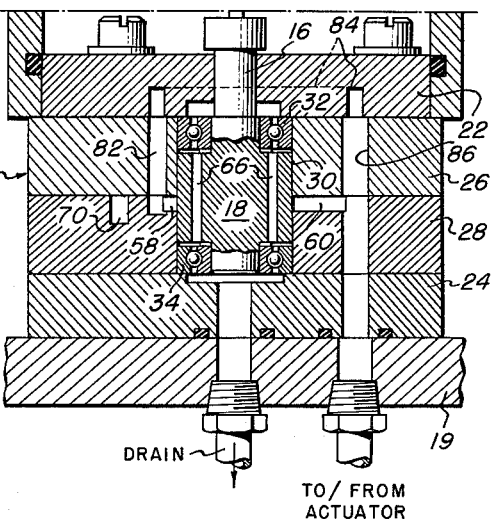
FIG. 6.
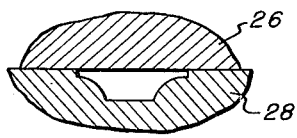
FIG. 7.
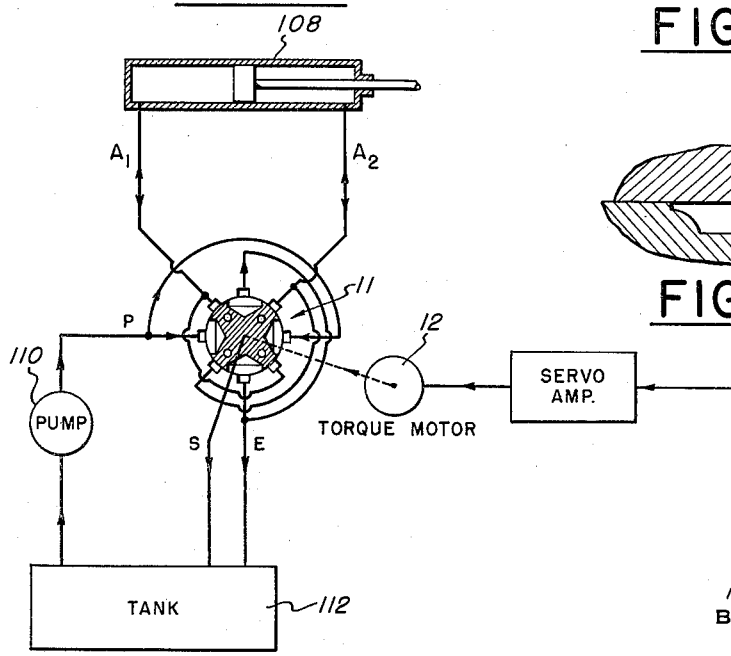
FIG. 9.
FIG. 8.
INVENTOR
PETER J. HERZL
BY
ATTORNEY United States Patent Office 3,007,494
Patented Nov. 7, 1961

3,007,494
ROTARY FLUID VALVE
Peter Joseph Herzl, Montreal, Quebec, Canada, assignor to Sperry Gyroscope Company of Canada, Ltd., Montreal, Quebec, Canada
Filed Nov. 24, 1959, Ser. No. 855,236
Claims priority, application Canada July 16, 1959
11 Claims. (Cl. 137—623)

This invention relates to fluid valves and more particularly to hydraulic servo valves.

In electrohydraulic servo systems it is a common technique to employ valve combinations including pilot valve operated servo valves, the pilot valve being actuated by an electromagnetic actuator. The two valves are used because the servo valves do not have sufficient sensitivity while the pilot valves do not have sufficient gain or power handling capacity. Use of two valves requires extra fluid supply apparatus in connection with the pilot valve and also results in added oil consumption. In addition, there is the inherent time delay of the pilot valve, and, because of the small ports of this valve, sticking often occurs.

The aforementioned disadvantages are avoided by the unique valve structure of the present invention which results in such a high sensitivity and great gain that, in many cases where formerly two valves were necessary, only a single valve stage is required, thus eliminating the need for a pilot valve. Additionally, certain novel features of the invention make it simple to build-in desirable control characteristics and even to utilize beneficially the "closing forces" generated within the valve and to which all hydraulic valves are subject to some degree.

One aspect of the present invention contemplates a valve wherein a plurality of consecutive laminae clamped together form a stratified valve body in which the valve bore extends through a number of consecutive ones of said laminae, and wherein valve ports and interconnecting passages are formed in the mating surfaces at the interface of adjacent laminae. Diametrically opposite recesses in the movable valve member and the use of symmetrical complementary porting in the valve body balance the valve under dynamic conditions with respect to forces tending to press the movable valve member against the surface of the valve bore. Because the ports are formed along a line at the interface of adjacent laminae of the valve body, their shape can be readily controlled during construction to provide desirable control characteristics, added sensitivity, and to control self-centering forces generated in the valve. Another phase of the invention is directed to a novel flexible mounting of the valve actuator to promote axial alignment of actuator and valve, thus to further facilitate manufacture of the complete unit and to further increase the sensitivity of the actuator-valve unit. The respective features of the valve not only add to its sensitivity and gain, but also facilitate the manufacture thereof and provide a compact package.

It is therefore an object of the present invention to provide an hydraulic valve of the balanced flow type having high sensitivity and gain.

Another object of the invention is to provide a fluid valve apparatus which, during fabrication, lends itself to a control of the magnitude and effect of static state and transient flow forces generated in the valve.

Another object of the invention is improved constructional control of the shape and proportions of the ports and connecting passageways of a valve.

A further object of the invention is to provide a valve structure having simple constructional details which make it easy to build-in desired control characteristics such as excellent linearity or precise deliberate non-linearity.

Other and further objects and advantages of the present invention will be apparent from the following description, reference being had to the accompanying drawings wherein a preferred form of the present invention is clearly shown.

Figure 3:
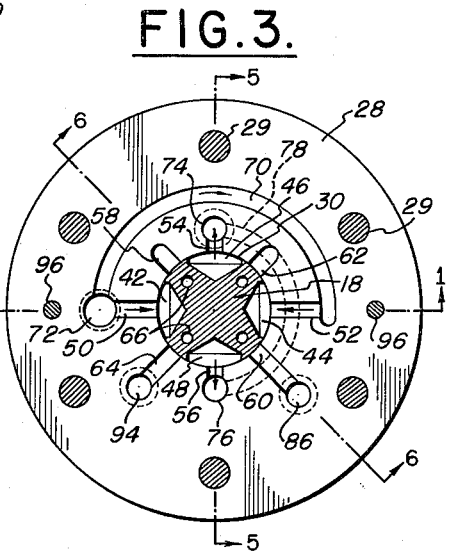
Figure 2:
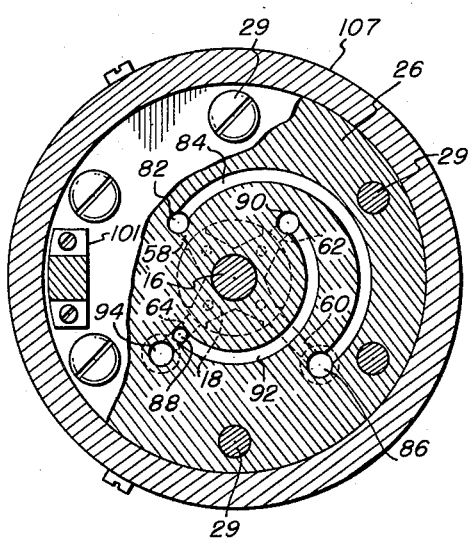
Figure 4:
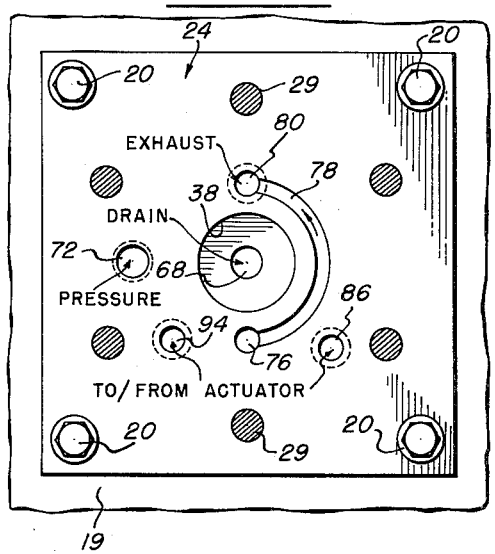

In the drawings:

FIG. 1 is a vertical section of an electrohydraulic servo valve embodying features of the invention, the section being taken along the line 1—1 of FIG. 3;

FIGS. 2, 3 and 4, are sections respectively taken along the lines 2—2, 3—3, and 4—4 of FIG. 1, showing the balanced radial porting arrangement and illustrating the connecting passages located at various levels and formed in mating surfaces of adjacent laminae;

FIGS. 5 and 6 are sectional views respectively taken along lines 5—5 and 6—6 of FIG. 3, and further illustrating the unique laminated valve body structure and its port and interlinking passage arrangement;

FIGS. 1, 5 and 6, also illustrate the suspension and arrangement of the movable member of the apparatus;

FIGS. 7 and 8 illustrate variations of the cross-sectional contour of the internal radial slots provided in the body of the valve; and FIG. 9 is a circuit diagram illustrating one use of the valve described in the other figures.

As seen in FIG. 1, an electrohydraulic servo valve unit 10 includes a valve 11 which has mounted thereon an electrical actuator 12, for example, a reversible torque motor, whose output shaft 14 is coupled to a shaft 16 carrying a valve rotor 18. The shafts are coupled together by a clamp 17 around the hollow split end of shaft 16 into which the end of the shaft 14 is inserted.

The valve 10, which is shown secured to a panel 19 by screws 20, includes a valve body 21 having a laminated or stratified structure formed by a plurality of sections including opposite end sections 22 and 24 and intermediate sections 26 and 28 connected by bolts 29. A cylindrical bore 30 of uniform diameter axially extends through the intermediate sections 26 and 28, and the rotary valve member 18 is journaled within the bore 30 by rolling friction bearings 32 and 34, for example ball bearings, fitted within the bore 30 and in engagement with shaft extensions at opposite ends of the member 18. For directional reference the axis of the valve is considered to be the same as that of the valve member and bore, and all axial references mentioned herein and not otherwise qualified relate to the direction of this axis. Recessed portions 36 and 38 of the end sections 22 and 24 form the end walls 36 and 38 of the bore 30, the edges of these recesses forming annular shoulders providing end abutment for the outer races of bearings 32 and 34, while the inner races of the bearings bear on spacers 39 and 40 between them and the land providing portion of the rotary valve member 18. The shaft 16 of the member 18 extends freely through an aperture 41 in the end section 22.

Formed in the peripheral surface of the member 18 are two quadrature-related pairs of diametrically opposed outwardly facing recesses 42–44 and 46–48, the land providing area between the recesses slideably engaging the surface of the valve bore 30. The lands of the member 18 are arranged in balanced symmetrical relation to the axes of the bore and provide four equal recesses therebetween. A plurality of pairs of complementary ports opening into the valve bore 30 are disposed along a line around the periphery of the bore to permit registry with certain ones of the recesses in various predetermined angular positions of the member. In the particular arrangement shown, there are two commonly connected intake or pressure ports 50 and 52, a pair of commonly connected exhaust ports 54 and 56, a commonly connected pair of control ports 58 and 60, and another set of commonly connected control ports 62 and 64. The relationship of the ports to the recesses of the valve member is such that in the neutral or "crossover" position shown in FIG. 3, all the ports are blocked, while in either of the two operated positions the intake or pressure ports are connected to a set of common control ports while the exhaust ports are connected to the other set of common control ports. The common connection between oppositely located ports and the symmetrical disposition of the recesses in member 18 provides what may be termed "balanced porting" and results in a balanced valve. This means that lateral forces tending to press the rotary valve member against the surface of the bore are eliminated. Although the illustrated valve constitutes what is known as a four-way valve, features of the present invention are not confined to a four-way valve arrangement. External access is provided for all the ports.

Relief from pressures due to leakage between the rotary valve member and the bore walls is provided by internal passages 66 extending axially through the member and a drain passage 68 in the end section 24 communicating with the end of the bore 30 and adapted for connection at atmospheric pressure to the reserve tank of the hydraulic system.

The various ports and internal interconnecting passages between complementary sets of ports are fabricated by preforming slots, channels and apertures in the mating surfaces of various connected sections providing the stratified structure of the valve body. For example, all the ports are formed by fabricating radial slots of various lengths in the upper surface of the intermediate section 28 as is most clearly seen in FIG. 3. The fabrication of the internal slots may be by any suitable technique, for example, machining or milling. FIG. 3 also shows the arcuate channel or slot formed in the upper surface of the section 28, which channel, when closed after assembly by the lower surface of section 26, forms the interconnecting intake passage 70 between ports 50 and 52. External access to pressure ports 50 and 52 is provided by an axial intake passage or channel 72 formed in sections 24 and 28 connecting with the passage 70. Interconnection between the exhaust ports 54 and 56 and external access thereto is provided as follows. Axial passages or channels 74 and 76 leading from exhaust ports 54 and 56 respectively are interconnected by way of a channel or passage 78 provided in the upper face of the end section 24 which also has extending therethrough an external access passage 80 that is a continuation of passage 74.

The passage network for the control pair of ports 58 and 60 may be traced as follows. From port 58 through a passage 82 in section 26 (FIG. 6) thence through a passage 84 which connects to port 60 by way of a passage 86 in section 26. A continuation of passage 86 through sections 28 and 24 provides external access to this set of control ports 58 and 60. As in the case of passage 78 the passage 84 is also made by preforming a channel in the bottom surface of the end section 22.

Similar pre-fabrication is employed in forming the various passages associated with the set of control ports 62 and 64, which include axial passages 88 and 90 extending from the ports 62 and 64 through lamina 26 and interconnected by a passage 92. External access to this network is provided by an axial passage or channel 94 extending through laminae 28 and 24.

Holes in the panel 19, threaded for the receipt of conduit connections, communicate with the respective intake, exhaust, control and leakage drain external access passages in the valve body. O-ring seals in suitable channels effect fluid-tight sealing around the joints between the panel holes and the associated external access passages.

In the fabrication of the valve body each of the consecutive sections is preformed independently of the others. At this stage each section is provided by suitable methods with the necessary holes, slots, channels, and the mating surfaces or interfaces for sealing engagement between sections. For example, the holes may be drilled, and the slots and channels machined as by milling, while mating surfaces (faces of the laminae or sections) may be lapped for the desired fit. In actual practice the intermediate sections 26 and 28 were preformed independently as described and with the valve bore roughed out in each, after which they were fitted together with the aid of dowel pins 96, and the bore 30 completed by final machining including lapping to fit. It should be particularly noted that the uniform diameter of the valve bore 30 facilitates the manufacture of the valve. The uniform diameter of the valve bore being such as to properly accommodate the outer races of the rotor bearings and the rotor itself, avoids many concentricity problems and promotes increased balanced and sensitivity. The passage means provided in the valve body includes a portion of the interfacial surface of one of the sections and an arrangement of internal intake, exhaust and control slots providing ports at the bore surface in the interfacial surface of the adjacent section. The axes of the bore porvided in the valve body is normal to the plane of the provided interface.

A particularly desirable advantage of the laminar structure of the valve body is the ability to form and the ease of so forming any desired port configuration. This is especially important in regard to the actuator ports which may be shaped to provide linearity or deliberate non-linearity, and to overcome or beneficially use the steady state flow forces generated in the valve, for example to aid in self-centering.

While FIG. 1 shows rectangular ports, FIGS. 7 and 8 are examples of different shapes of ports which are easily provided by reason of the unique valve structure disclosed herein.

Because of the overall sensitivity of the valve made in accordance with the principles of the invention herein, it is possible to build-in self-centering by controlled reaction or steady state flow forces. For example, the axial dimension of the opening or leading edge of the control port can be varied to give the valve and actuator combination a desired linearity. As the axial dimension of the leading edge of a control port is increased, the greater will be the reaction force tending to close or self-center the rotary valve member.

In order to promote ease of mutual shaft alignment between the torque motor 12 and the valve 10, the torque motor is flexibly mounted on a flat spring member 100 cantilevered, i.e., secured at one end only, in a bracket 101 fixed to the top of the end section 22. To avoid weakness in the area of attachment to the torque motor, the spring member 100 may be secured between the body of the torque motor and a rigid backing ring 102 by screws 103. The motor shaft 14 passes through the ring 102 and an aperture 104 in the spring 100. Universal adjustment in a plane normal to the motor axis is made possible by clamping the fixed end of the spring member 100 between the walls of a slot 105 in the bracket 101, clamping force being supplied by a screw 106. The flexibility of the spring member and its possible adjustments add to the sensitivity of the valve apparatus by reducing the possibility of shaft misalignment and attendant binding. The torque motor 12 is surrounded by a protective cover 107 attached to the valve body.

In practical use the electrohydraulic servo valve unit 10 may be connected in a system of the type shown in FIG. 9 wherein the respective pairs of control ports of the valve 11 are respectively coupled to opposite operating ports of a double-acting motor 108, and the valve pressure ports are connected to the output of a pump 110 whose intake is connected to a fluid sump 112 to which both the exhaust and leakage drain connections are returned. The leakage drain or sump connection is separate from the exhaust connection and returned to the tank at atmospheric pressure to avoid any positive back pressure which might force fluid past the rotor and up into the actuator 12.

It will be apparent from the drawings that when the rotary valve member is moved to one side of neutral, the pressure or intake ports are connected through one pair of control ports to one side of the motor 108 while the other side of the motor is connected to the exhaust ports through the other set of control ports. The pressure and exhaust connections to the motor are reversed when the rotary valve member is moved to the other side of neutral.

What is claimed is:

1. Valve apparatus comprising a fluid valve including a valve body having a cylindrical valve bore therein, a rotor disposed in said bore, an actuator having a rotative output shaft coupled to the rotor, actuator mounting means including a bracket attached to said valve body and cantilever spring means for flexibly carrying said actuator with the shaft of the latter in substantial alignment with the rotor, said spring means being adjustably attached at one end to said bracket to provide adjustment of the spring means and the actuator in a plane normal to the actuator shaft.

2. In fluid valve apparatus, a valve body including contiguous discrete sections having formed therein a cylindrical valve bore which in its axial direction intersects the interface between said sections, a valve rotor disposed in said bore and having a peripheral surface in slideable engagement with walls of the bore, a recess in the peripheral surface of the valve member, said valve body having a port communicating with said bore at said interface, said port being formed by defining means comprising a slot in the mating surface of one of the sections, said valve rotor being rotatable to bring said recess into registry with said port, a valve actuator having a rotative output shaft coupled to said rotor, means for flexibly mounting said actuator on said valve body, said mounting means comprising a bracket affixed to said valve body and cantilever spring means carrying said actuator and adjustably attached at one end to said bracket, said adjustable attachment providing adjustment of the cantilever spring and said actuator in a plane normal to the actuator axis.

3. Valve apparatus comprising a fluid valve including a valve body having a cylindrical valve bore therein, a rotor disposed in said bore, an actuator having a rotative output shaft coupled to the rotor, actuator mounting means including spring means for flexibly carrying said actuator with the shaft of the latter in substantial alignment with the rotor, said spring means being attached only at one end to said valve body, said attachment being adjustable.

4. In an hydraulic valve of the balanced flow type, a valve body consisting of two connected discrete sections having an interface and a common cylindrical bore with an axis normal to the plane of the interface, a rotary valve member mounted in the bore of the body having four lands arranged in balanced symmetrical relation to the axis that move with relation to the surface of the bore and provide four equal recesses therebetween, and passage means in the valve body including a portion of the interfacial surface of one of the sections and a balanced arrangement of a radial pair of internal intake slots providing opposed ports at the bore surface, of a radial pair of internal exhaust slots providing opposed ports at the bore surface, and of radial pairs of internal control slots providing opposed ports at the bore surface in the interfacial surface of the other section.

5. A valve of the character claimed in claim 4, in which said passage means includes internal slots in the valve body connecting each of the pairs of intake, exhaust and control slots, an axial intake channel in the body to the connecting slot for the intake pair of slots, an axial exhaust channel in the valve body to the connecting slot for the exhaust pair of slots, a first axial control channel in the valve body to the connecting slot for one of the pairs of control slots, and a second axial control channel in the valve body to the connecting slot for the other of the pairs of control slots.

6. In an hydraulic valve of the balanced flow type, a laminar valve body consisting of a first end section, a first intermediate section connected to the first end section at a first interface, a second intermediate section connected to the first intermediate section by a second interface, a second end section connected to the second intermediate section by a third interface and a cylindrical bore common to the intermediate sections with an axis normal to the plane of the second interface, a rotary valve member mounted in the bore of the body having four lands arranged in balanced symmetrical relation to the axis that move with relation to the surface of the bore and provide four equal recesses therebetween, and passage means in the valve body including a portion of the second interface of the first intermediate section and a balanced arrangement of a radial pair of internal intake slots providing opposed ports at the bore surface, of a radial pair of internal exhaust slots providing opposed ports at the bore surface, and of radial pairs of internal control slots providing opposed ports at the bore surface in the second interface of the second intermediate section.

7. A valve of the character claimed in claim 6, in which said passage means includes an internal slot in the second intermediate section connecting the pair of intake slots, an axial intake channel in the valve body to the connecting intake slot, an internal slot in one of the end sections connecting the pair of exhaust slots, an axial exhaust channel in the valve body to the connecting exhaust slot, a first internal slot in the other of the end sections connecting one of the pairs of control slots, a first axial control channel in the valve body to the first connecting control slot, a second internal slot in the other of the end sections connecting the other of the pairs of control slots, and a second axial control channel in the valve body to the second connecting control slot.

8. A valve of the character claimed in claim 6, including a valve actuator having a rotative shaft coupled to the rotary valve member, and means for mounting said actuator with the shaft in substantial alignment with the valve member including a bracket fixed to one of the ends sections of the valve body, a cantilever spring carrying said actuator, and an adjustable attachment connecting one end of the spring and the bracket.

9. A valve of the character claimed in claim 6, in which the valve member includes an axial internal drain passage, and in which one of the end sections of the valve body includes an axial drain passage to one end of the cylindrical bore.

10. In an hydraulic valve, a valve body consisting of two connected discrete sections having an interface and a common cylindrical bore with an axis normal to the plane of the interface, a rotary valve member mounted in the bore having lands that move with relation to the surface of the bore and provide recesses therebetween, and passage means in the valve body including a portion of the interfacial surface of one of the sections and an arrangement of radial intake, radial exhaust and radial control slots providing ports at the bore surface in the interfacial surface of the other section.

11. Valve apparatus comprising an hydraulic valve of the balanced flow type with a valve body consisting of two connected discrete sections having an interface and a common cylindrical bore with an axis normal to the plane of the interface, a balanced valve member fitting the cylindrical bore having a shaft concentric to the axis of the bore, a valve actuator having a rotative shaft, means for mounting said actuator with its shaft in substantial alignment with the shaft of the valve member including a bracket fixed to one of the sections of the valve body, a cantilever spring carrying said actuator, and an adjustable attachment connecting one end of the spring and bracket, and means for coupling the shaft of the actuator to the shaft of the valve member.

References Cited in the file of this patent

UNITED STATES PATENTS

| | | |
|---|---|---|
| 2,239,139 | Allin | Apr. 22, 1941 |
| 2,349,641 | Tucker | May 23, 1944 |
| 2,524,234 | Schenk | Oct. 3, 1950 |
| 2,661,724 | Blenkle | Dec. 8, 1953 |
| 2,917,080 | Hatch | Dec. 15, 1959 |

FOREIGN PATENTS

| | | |
|---|---|---|
| 804,897 | Great Britain | Nov. 26, 1958 |